(12) United States Patent
Ohzawa (10) Patent No.: US 6,220,712 B1
(45) Date of Patent: Apr. 24, 2001

(54) OBLIQUE PROJECTION OPTICAL SYSTEM

(75) Inventor: Soh Ohzawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/447,892

(22) Filed: Nov. 23, 1999

(30) Foreign Application Priority Data

Nov. 26, 1998 (JP) .................................................. 10-335472

(51) Int. Cl.[7] .................................................. G03B 21/14
(52) U.S. Cl. .................................................. 353/70
(58) Field of Search .............................. 353/69, 70, 102, 353/122

(56) References Cited

U.S. PATENT DOCUMENTS

| | | | |
|---|---|---|---|
| 4,455,067 | * 6/1984 | Hoppmann et al. | 353/69 |
| 5,032,022 | * 7/1991 | Sato et al. | 353/69 |
| 5,274,406 | * 12/1993 | Tejima et al. | 353/69 |
| 5,302,983 | * 4/1994 | Sato et al. | 353/69 |
| 5,475,534 | 12/1995 | Okajima et al. | 359/649 |
| 5,703,663 | * 12/1997 | Fujioka et al. | 353/70 |
| 5,709,445 | 1/1998 | Takamoto | 353/70 |
| 5,820,240 | * 10/1998 | Ohzawa | 353/70 |
| 5,947,576 | 9/1999 | Sato et al. | 353/70 |
| 5,986,806 | 11/1999 | Sugawara | 359/557 |

FOREIGN PATENT DOCUMENTS

| | | |
|---|---|---|
| 5-119283 | 5/1993 | (JP) . |
| 5-134213 | 5/1993 | (JP) . |
| 6-186496 | 7/1994 | (JP) . |
| 7-151994 | 6/1995 | (JP) . |

* cited by examiner

Primary Examiner—William Dowling
(74) Attorney, Agent, or Firm—Sidley & Austin (57) ABSTRACT

An oblique projection optical system, having a wide field angle and high magnification, includes a compact optical system that provides sufficient inclination projection angle. The optical system includes a plurality of lens elements that optically interact to reduce trapezoid distortion.

14 Claims, 11 Drawing Sheets

OBLIQUE PROJECTION OPTICAL SYSTEM

CROSS-REFERENCE TO RELATED APPLICATIONS

This Application is based on Patent Application No. 10-335472 filed in Japan, the content of which is hereby incorporated by reference.

FIELD OF THE INVENTION

The present invention relates to an oblique projection optical system, and specifically relates to an oblique projection optical system for projecting in an oblique direction from a primary image surface to a secondary image surface, and is suitable for image projection devices, and image reading devices.

BACKGROUND OF THE INVENTION

Projection devices which enlarge and project an image displayed on, for example, a liquid crystal display onto a screen are well known. There have been various proposals for projection devices which project an image from an oblique direction onto a screen for the purpose of making a more compact projection device while enlarging the screen. This type of oblique projection device is advantageous in that the projection optical system does not block the field of view of the observer since the projection optical system is arranged at a position removed from the center of the screen. However, the oblique projection devices also produce so-called trapezoid distortion in the projection image. There have also been various proposed projection optical systems to correct this trapezoid distortion. For example, Japanese Laid-Open Patent Application Nos. HEI 5-119283 and HEI 5-134213 disclose projection optical systems which are partially eccentric to correct the trapezoid distortion.

The projection optical systems disclosed in Japanese Laid-Open Patent Application Nos. HEI 5-119283 and HEI 5-134213 are not adequately satisfactory from the perspectives of compactness and high performance.

SUMMARY OF THE INVENTION

An object of the present invention is to provide an improved oblique projection optical system.

Another object of the present invention is to provide an oblique projection optical system which has a wide field angle and high magnification, and which achieves a compact overall length of the optical system and lens diameter while providing sufficient inclination projection angle.

These objects are attained by an oblique projection optical system for enlarging and projecting in an oblique direction from a primary image surface to a secondary image surface, said oblique projection optical system being provided with two or more mutually eccentric lenses, wherein an intermediate real image is not formed between the primary image surface and the secondary image surface, and wherein conditional equations (1) through (3) below are satisfied when rays connecting the screen center of the primary image surface and the screen center of the secondary image surface are center screen rays:

$$15° < \theta_{oi} < 40° \quad (1)$$

$$20° < \theta_o < 50° \quad (2)$$

$$0° \leq \theta_i < 5° \quad (3)$$

where, $\theta_{oi}$ represents an angle formed between the primary image surface (I1) and the secondary image surface (I2), $\theta_o$ represents an angle formed between a line normal to the secondary image surface (I2) and center screen ray, and $\theta_i$ represents an angle formed between a line normal to the primary image surface (I1) and the center screen ray.

BRIEF DESCRIPTION OF THE DRAWINGS

These and other objects and features of this invention will become clear from the following description taken in conjunction with the preferred embodiments with reference to the accompanying drawings, in which.

DESCRIPTION OF THE PREFERRED EMBODIMENTS

Figure 1:
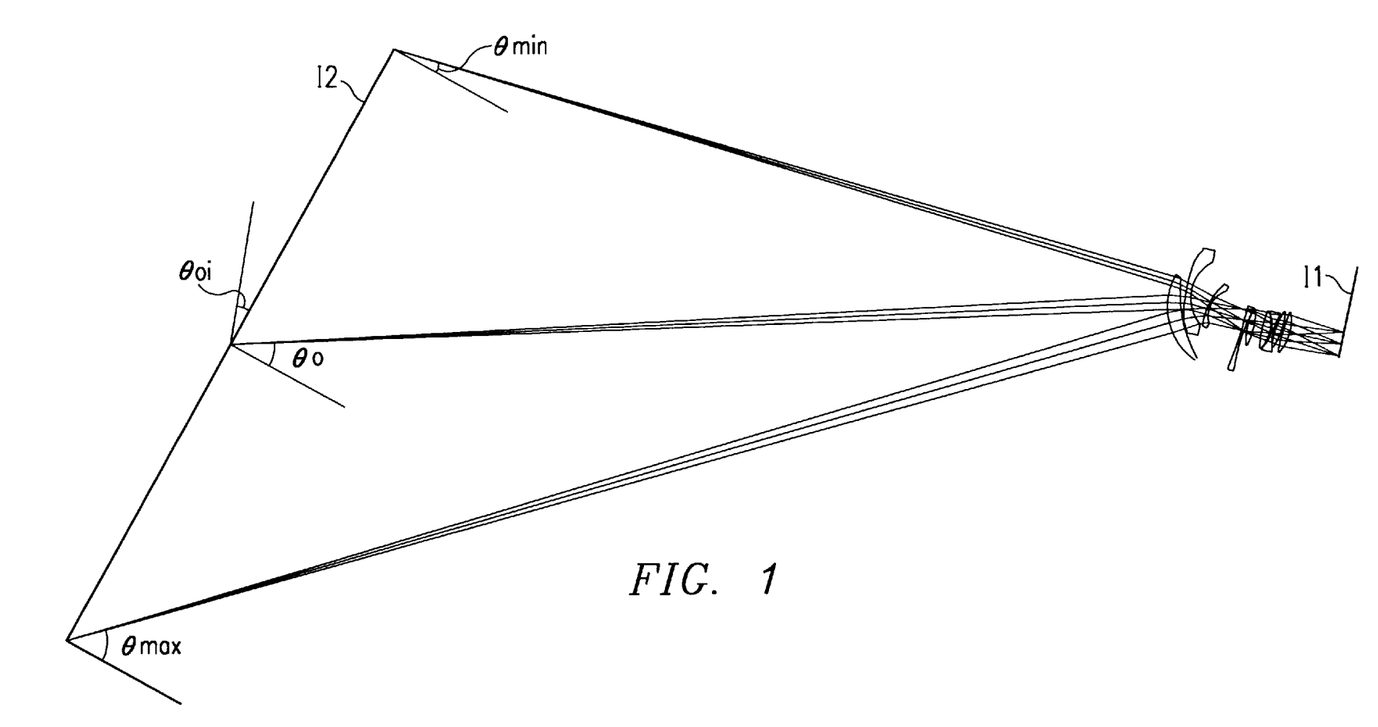
FIG. 1 is an optical path diagram showing a first mode (first embodiment)
Figure 2:
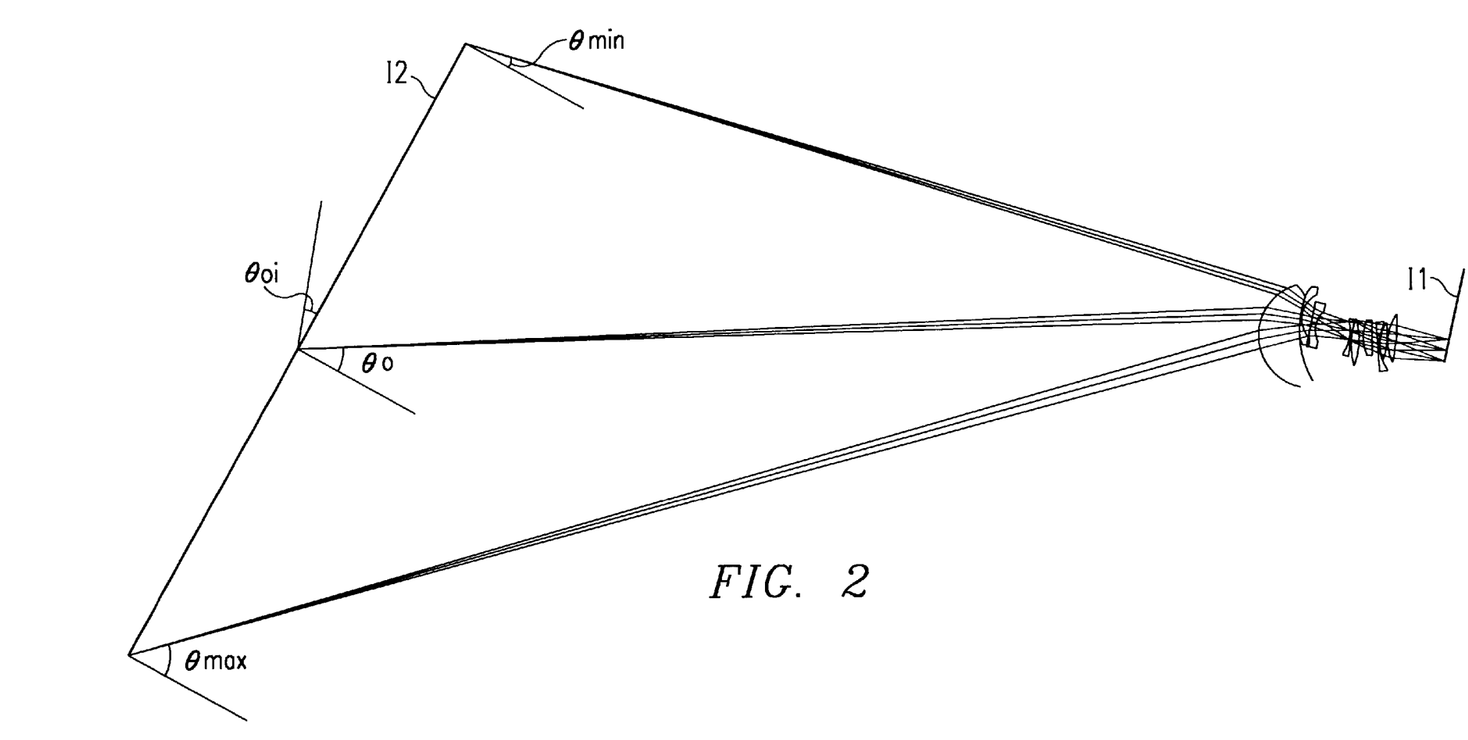
FIG. 2 is an optical path diagram showing a second mode (second embodiment)
Figure 3:
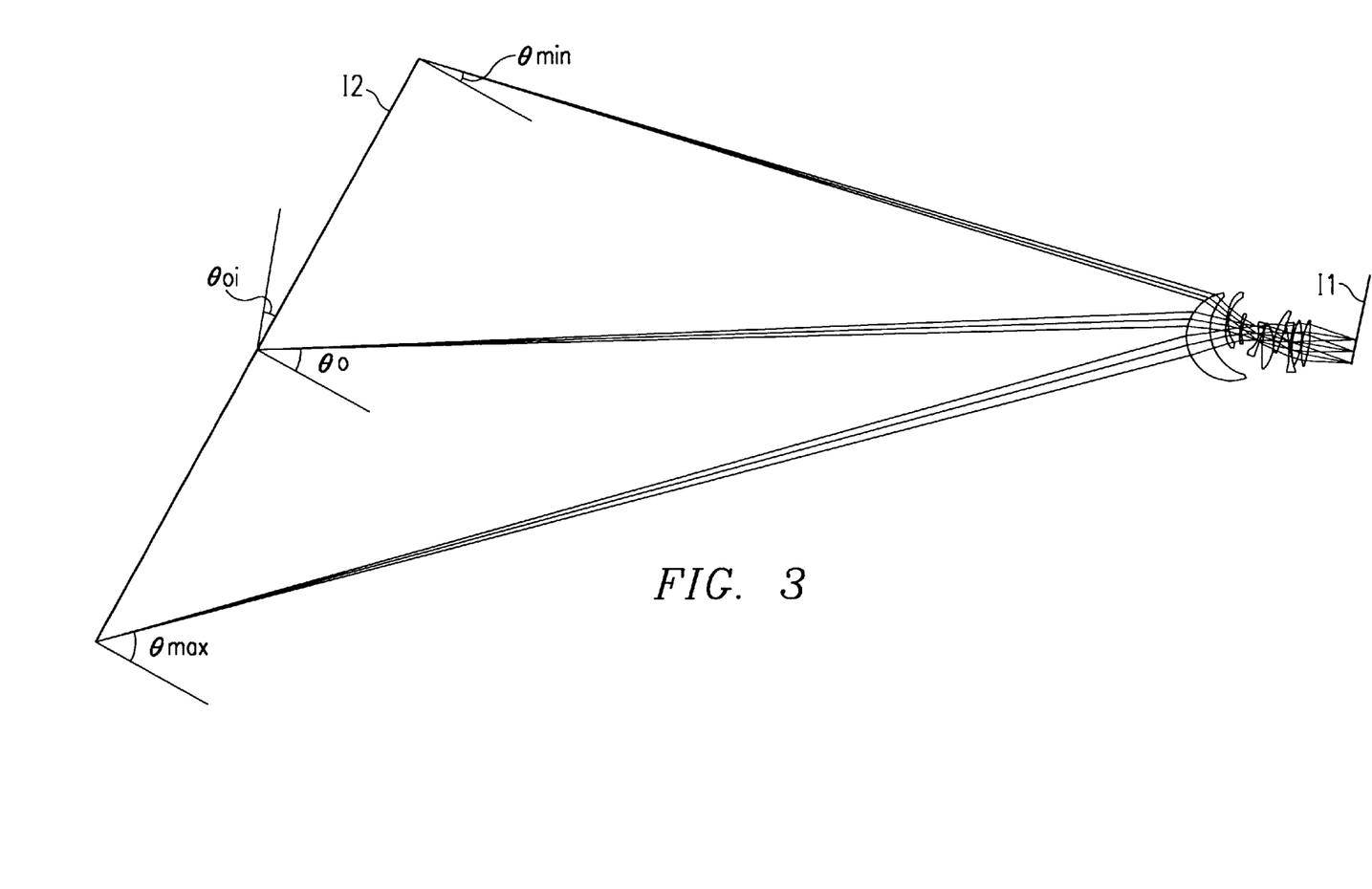
FIG. 3 is an optical path diagram showing a third mode (third embodiment)
Figure 4:
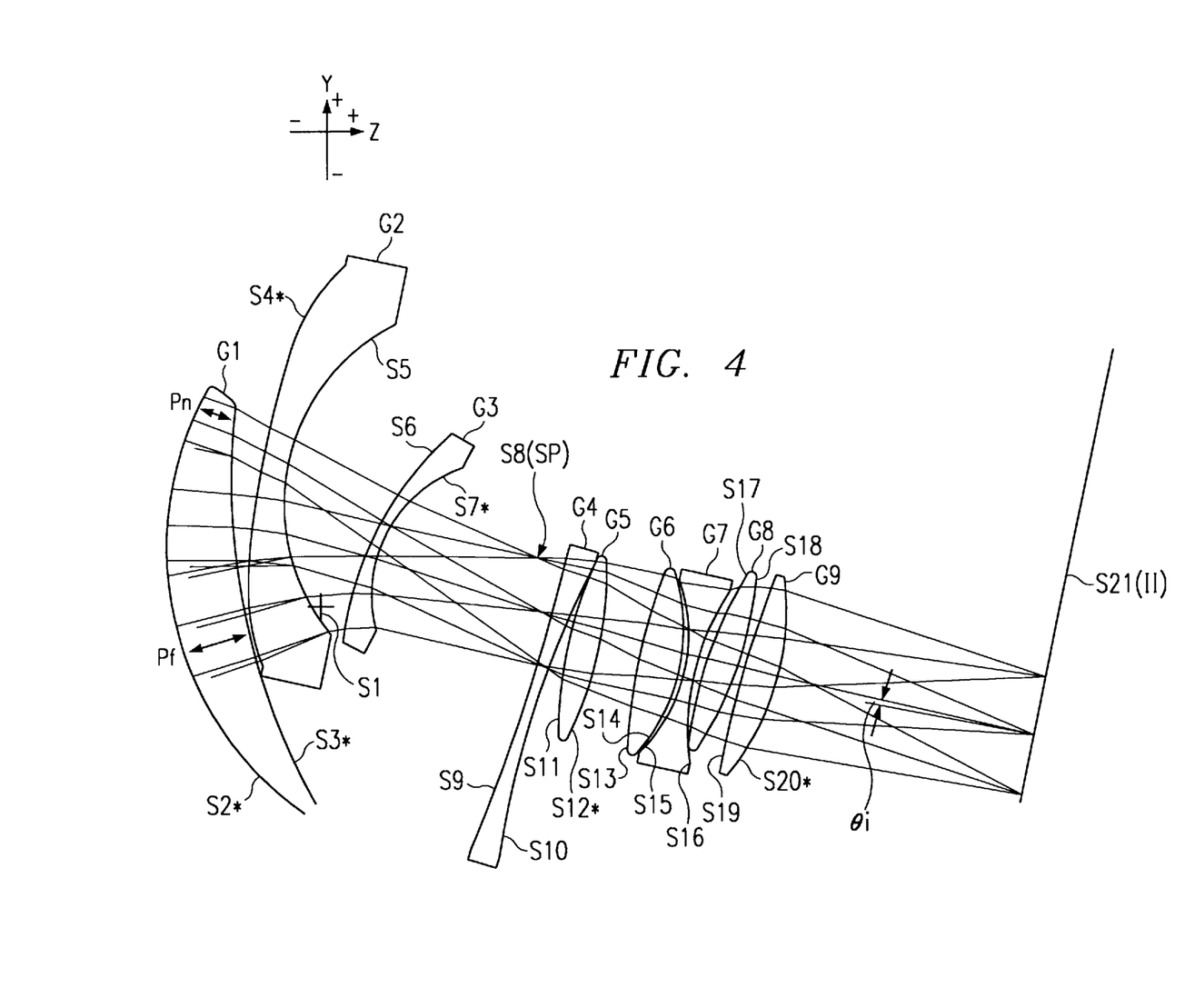
FIG. 4 shows the lens construction and optical path of the first mode (first embodiment)
Figure 5:
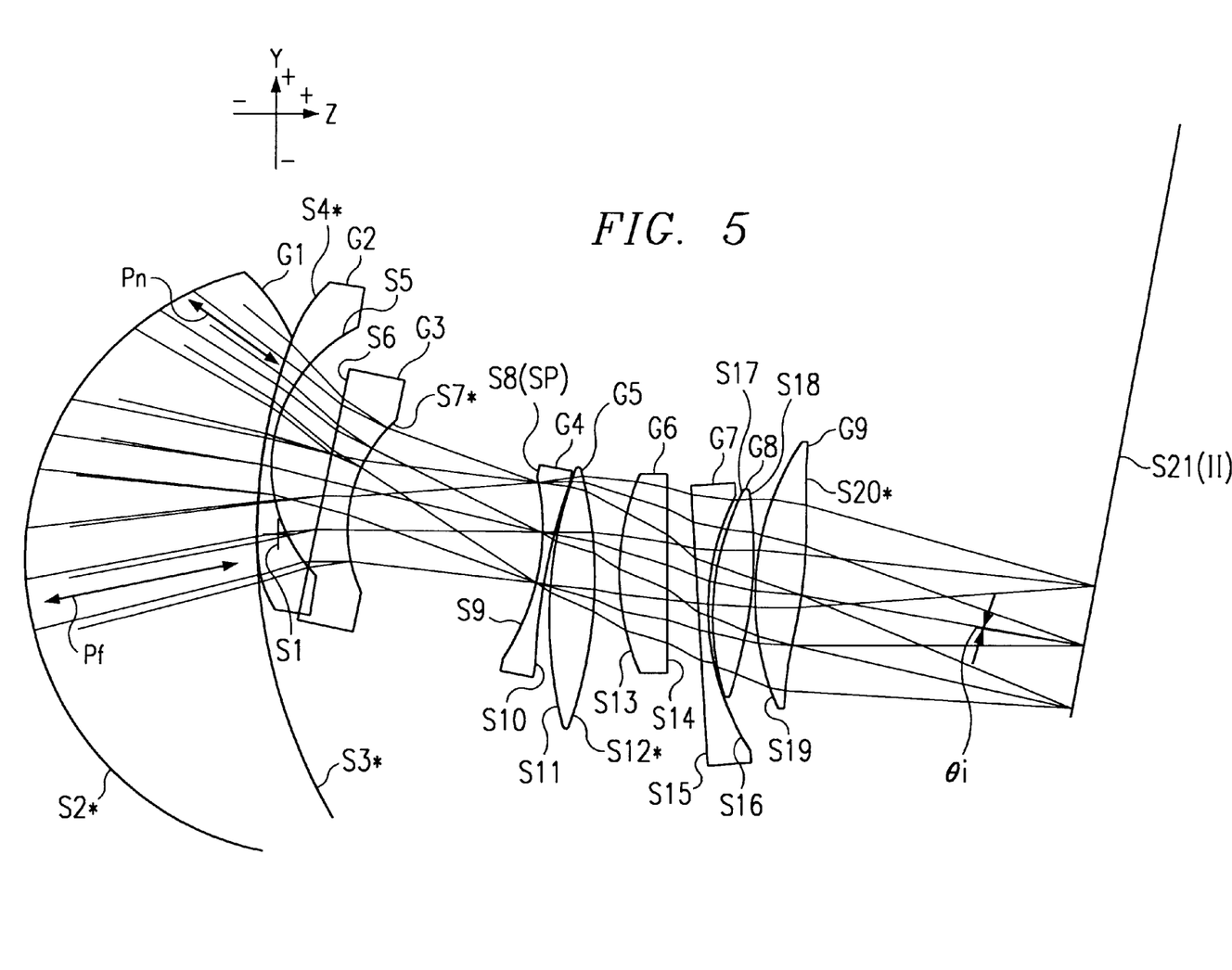
FIG. 5 shows the lens construction and optical path of the second mode (second embodiment)
Figure 6:
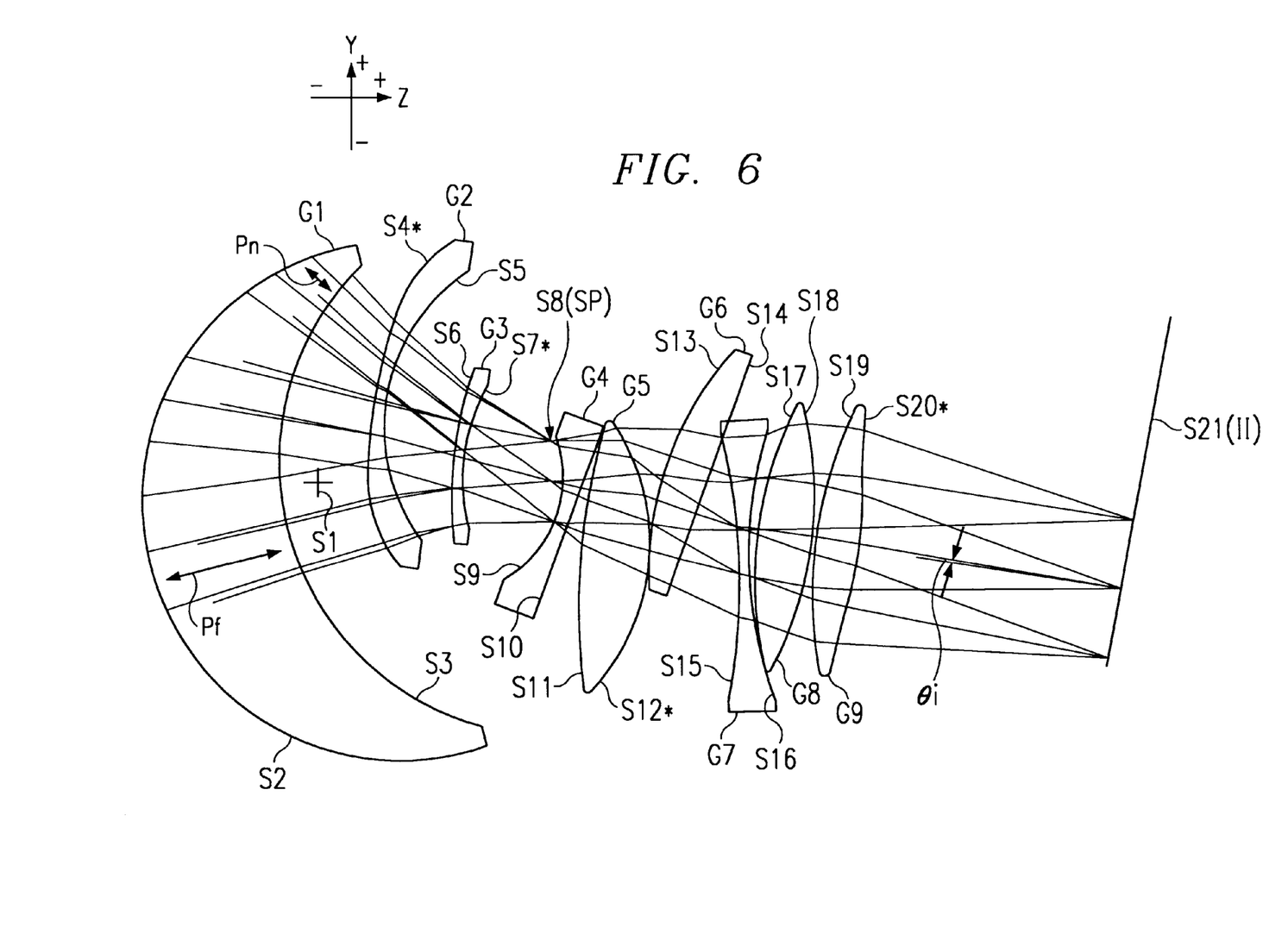
FIG. 6 shows the lens construction and optical path of the third mode (third embodiment)

The embodiments of the oblique projection optical system of the present invention are described hereinafter with reference to the accompanying drawings. FIGS. 1 through 3 show the complete optical paths from a primary image surface (I1) to a secondary image surface (I2) and respectively correspond to the first through third embodiments. FIGS. 4 through 6 show the lens construction and optical paths corresponding to the first through third embodiments. Each optical path diagram is shown in YZ cross section in the orthogonal coordinate system (X, Y, Z) described later, and in FIGS. 4 through 6 the surfaces Si (i=1, 2, 3 . . . ) having an appended asterisk mark (*) are aspherical surfaces.

The first through the third embodiments are oblique projection optical systems used in image projection devices which enlarge and project in an oblique direction from a primary image surface (I1) to a secondary image surface (I2). Accordingly, the primary image surface (I1) corresponds to a display element surface (e.g., the display surface of a liquid crystal display (LCD)) for displaying a two-dimensional image, and the secondary image surface (I2) corresponds to a projection image surface (i.e., a projection screen). Each embodiment may also be used in image reading devices as an oblique projection optical system which reduces and projects in an oblique direction from a secondary image surface (I2) to a primary image surface (I1). For such use, the primary image surface corresponds to the photoreceptor surface of a photoreceptor element surface for image reading (e.g., a charge-coupled device (CCD)), and the secondary image surface (I2) corresponds to a read image surface (i.e., a document surface such as film or the like).

In the first and second embodiments, a first lens element (G1) positioned on the outermost enlargement side (i.e., the secondary image surface (I2)) has bilateral surfaces (S2, S3) with a convex shape on the enlargement side, such that the radius of curvature of the reduction side surface (S3) is greater than the radius of curvature of the enlargement side surface (S2), wherein both surfaces (S2) and (S3) are mutually eccentric axially symmetric aspherical surfaces. On the reduction side of the first lens element (G1) (i.e., on the primary image surface (I1) side) are arranged a second lens element (G2) having a negative aspherical surface on one side, a third lens element (G3) having a negative aspherical surface on one side, a stop (SP), a negative fourth lens element (G4), a fifth lens element (G5) having a positive aspherical surface on one side, a positive sixth lens element (G6), a negative seventh lens element (G7), a positive lens element (G8), and a ninth lens element (G9) having a positive aspherical surface on one side. The lens elements (G1) through (G9) and the primary and secondary image surfaces (I1) and (I2) are eccentric relative to the standard surface (S1), and bilateral surfaces (S2 and S3) of the first lens element (G1) are mutually eccentric.

In the third embodiment, the first lens element (G1) positioned on the outermost enlargement side has bilateral surfaces (S2 and S3) with a convex shape on the enlargement side, and is a positive optical power lens wherein the radius of curvature of the reduction side surface (S3) is greater than the radius of curvature of the enlargement side surface (S2). On the reduction side of the first lens element (G1) are arranged a second lens element (G2) having a negative aspherical surface on one side, a third lens element (G3) having a negative aspherical surface on one side, a stop (SP), a negative fourth lens element (G4), a fifth lens element (G5) having a positive aspherical surface on one side, a positive sixth lens element (G6), a negative seventh lens element (G7), a positive eighth lens element (G8), and a ninth lens element (G9) having a positive aspherical surface on one side. The lens elements (G1) through (G9) and the primary and secondary image surfaces (I1, I2) are eccentric relative to the standard surface (S1).

It is desirable that each embodiment is provided with two or more mutually eccentric lens elements, and does not form an intermediate real image from the primary image surface (I1) to the secondary image surface (I2) so as to provide an optical system having a compact total length. It is desirable that the optical construction of the oblique projection optical system satisfies the conditional equations below.

It is desirable that conditional equations (1) through (3) are satisfied when rays connecting the screen center of the primary image surface and the screen center of the secondary image surface are center screen rays.

$$15° < \theta_{oi} < 40° \quad (1)$$

$$20° < \theta_o < 50° \quad (2)$$

$$0° \leq \theta_i < 5° \quad (3)$$

where, $\theta_{oi}$ represents an angle formed between the primary image surface (I1) and the secondary image surface (I2), $\theta_o$ represents an angle formed between a line normal to the secondary image surface (I2) and center screen ray, and $\theta_i$ represents an angle formed between a line normal to the primary image surface (I1) and the center screen ray.

When the lower limit of conditional equation (1) is exceeded, the primary image surface (I1) and the secondary image surface (I2) approach a parallel state, so as to require the entrance pupil to approach the exit pupil to suppress trapezoid distortion. For this reason it is difficult to achieve a telecentric construction (i.e., the pupil is far away) on the reduction side. As a result, color irregularities are generated by the display element (e.g., an optical element having angular characteristics such as an LCD and the like), arranged at the position of the primary image surface (I1), and the color separation/color combination system (dichroic mirror, dichroic prism and the like), arranged near the display element. When the upper limit of conditional equation (1) is exceeded, it becomes difficult to correct coma and astigmatism because the amount of eccentricity becomes excessive for each lens to suppress trapezoid distortion.

When the lower limit of conditional equation (2) is exceeded, the oblique projection effectiveness is reduced. For example, in a front projector, the advantage of viewing the screen from the front is lost, and in a rear projector, the thinning effectiveness is lost. When the upper limit of conditional equation (2) is exceeded, trapezoid distortion due to oblique projection cannot be suppressed.

When the range of conditional equation (3) is exceeded, oblique illumination is required relative to the display element surface of the primary image surface (I1). This requirement complicates the illumination system, and increases the cost when an LCD is used due to problems such as black/white inversion of the projection image.

The lens element (G1) on the outermost enlargement side in each embodiment is provided with bilateral surfaces having a convex shape on the enlargement side, and the radius of curvature of the reduction side surface (S3) is greater than the radius of curvature on the enlargement side surface (S2). It is desirable that the cross section of the screen center rays at a position oblique to the secondary image surface (I2) satisfies the conditional equation (4) below:

$$1.2 < Pf/Pn < 2.7 \quad (4)$$

where,

Pn represents a distance between an incident point on the surface (S3) of the lens element (G1) and an exit point on the surface (S2) of the lens element (G1) for a smallest principal ray, transmitted by the lens element (G1), that forms a smallest angle with a line normal to the secondary image surface, and Pf represents a distance between an incident point on the surface (S3) of the lens element (G1) and an exit point on the surface (S2) of the lens element (G1) for a largest principal ray, transmitted by the lens element (G1), that forms a largest angle with a line normal to the secondary image surface.

The smallest principal ray is incident on the secondary image surface (I2) at a position nearest the stop (SP). The angle formed between the smallest principal ray and the line normal to the secondary image surface (I2) is $\theta_{min}$, as represented in FIGS. 1 through 3. The largest principal ray is incident on the secondary image surface (I2) at a position farthest from the stop (SP). The angle formed between the largest principal ray and the line normal to the secondary image surface (I2) is $\theta_{max}$, as represented in FIGS. 1 through 3.

By forming both lens surfaces of the first lens element (G1) in a convex shape on the enlargement side, the rays from the enlargement side (when the projection optical system is viewed as a reduction system) are prevented from reaching a large angle at each surface of the first lens element (G1). Accordingly, the generation of excessive aberration can be prevented. Furthermore, when the first lens element (G1) can be provided with positive optical power by having the radius of curvature of the reduction side surface (S3) greater than the radius of curvature of the enlargement side surface (S2). In this way, the light from the screen fringe can be condensed in the center of the stop (SP), and as a result, the distance is reduced from the optical surface (S2) on the outermost enlargement side to the stop (SP), so as to make a compact total length of the optical system.

When the lower limit of conditional equation (4) is exceeded, a prism effect of bending the rays from the enlargement side in the negative Y-axis direction is greatly diminished, so as to make it difficult to correct trapezoid distortion and astigmatism generated by oblique projection. When the upper limit of conditional equation (4) is exceeded, the aforesaid prism effect becomes excessive, so as to make it difficult to correct asymmetrical color aberration generated by the first lens element (G1).

It is desirable that the negative lens element, which satisfies conditional equation (5) below in the cross section of the center screen rays at a position oblique to the secondary image surface (I2), has at least one lens element on the enlargement side of the stop (SP). In each embodiment, the negative lens which satisfies conditional equation (5) is the second lens element (G2):

$$1.7 < Nf/Nn < 3.5 \qquad (5)$$

where,

Nn represents a distance between an incident point on the surface (S5) of the second lens element (G2) and an exit point on the surface (S4) of the second lens element (G2) for a smallest principal ray, transmitted by the second lens element (G2), that forms a smallest angle with a line normal to the secondary image surface, and Nf represents a distance between an incident point on the surface (S5) of the second lens element (G2) and an exit point on the surface (S4) of the second lens element (G2) for a largest principal ray, transmitted by the second lens element (G2), that forms a largest angle with a line normal to the secondary image surface.

The lens back on the reduction side can be lengthened by arranging the negative lens elements (G2, G3) on the enlargement side of the stop (SP). In this way a color separation system such as a dichroic prism or the like can be easily positioned. When the lower limit of conditional equation (5) is exceeded, the prism effect produced by the negative lens element (G2) is greatly diminished, so as to make it difficult to correct asymmetric color aberration and enhances the prism effect of the first lens element (G1) positioned on the outermost enlargement side. When the upper limit of conditional equation (5) is exceeded, the prism effect of the negative lens element (G2) becomes excessive so as to make it difficult to correct asymmetric color aberration generated by the negative lens element (G2).

As in the first and second embodiments, it is desirable that both surfaces (S2, S3) of the first lens element (G1) positioned at the outermost enlargement side are both aspherical surfaces, and that both surfaces (S2, S3) are mutually eccentric. In this way the optical power in the X-axis direction and the optical power in the Y-axis direction can have greatly different values, so as to make it easy to correct the magnification difference in the X-axis direction and the Y-axis direction, and easy to correct astigmatic difference generated by oblique projection.

In each embodiment, a negative lens element (G4) is provided adjacent to the stop (SP) (on the reduction side), and on the reduction side of this negative lens element (G4), there are provided at least three lens elements (G6–G8) in positive-negative-positive order. It is desirable that the medium of the negative lens element (G7) among the positive-negative-positive array satisfies conditional equations (6) and (7) below:

$$Nb > 1.7 \qquad (6)$$

$$vb < 40 \qquad (7)$$

where,

Nb represents the refractive index relative to the d-line of the medium of the negative lens element (G7), and vb represents the Abbe number of the medium of the negative lens element (G7).

By arranging the negative lens element (G4) adjacent to the reduction side of the stop (SP), the lens back can be lengthened on the reduction side, and the reduction side approaches telecentricity. In this way the projection optical system easily conforms to input/output elements such as LCD and CCD and the like. Well balanced correction of aberration within the lens on the reduction side from the stop (SP) is possible by arranging the at least three lens elements (G6–G8) on the reduction side of the negative lens element (G4) in positive-negative-positive order. When the range of conditional equation (6) is exceeded, image plane curvature generated by other positive lenses cannot be prevented, and when the range of conditional equation (7) is exceeded, color aberration generated by other positive lenses cannot be corrected.

It is desirable that the lens element (G9) on the outermost reduction side is a biconvex positive lens which satisfies conditional equation (8) below:

$$0.1 < -Rs/Ri < 10 \qquad (8)$$

where,

Rs represents the radius of curvature of the surface (S19) on the enlargement side of the positive lens element (G9), and Ri represents the radius of curvature of the surface (S20) on the reduction side of the positive lens element (G9).

When a biconvex positive lens element is arranged on the outermost reduction side, the projection optical system readily conforms to input/output elements such as LCD and CCD since the reduction side approaches telecentricity. When the lower limit of conditional equation (8) is exceeded, image plane curvature cannot be suppressed because the radius of curvature Rs becomes too small such that the angle becomes excessive relative to the rays at the screen edge. When the upper limit of conditional equation (8) is exceeded, the radius of curvature Ri becomes too small, such that distortion correction becomes difficult at the edges of the screen.

The lens surfaces forming the projection optical system are desirably spherical surfaces or aspherical surfaces having rotationally symmetrical axes, or are spherical surfaces or partial aspherical surfaces having rotationally symmetrical axes. Such a construction makes it possible to effect processing by rotating the lens surface formation during lens manufacture. Accordingly, the lenses have excellent production qualities, and manufacturing costs can be stabilized.

The construction of the oblique projection optical system of the present invention is described in detail below by way of construction data, spot diagrams and the like.

In the construction data of each embodiment, the reference symbol Si (i=0, 1, 2, 3, . . . ) represents the surface number, counting from the secondary image surface (I2) side, in a system including a secondary image surface (I2; screen surface), an eccentric standard surface (S1; optical operation ignored), and a primary image surface (I1). The symbol ri (i=1, 2, 3, . . . ) represents the radius of curvature of a surface Si. The reference symbol di (i=0, 1, 2, 3, . . . ) represents the axial distance of a surface Si, counting from the is secondary image surface (I2) side. Ni (i=1, 2, 3, . . . ) and vi (i=1, 2, 3, . . . ) respectively represent the refractive index (Nd) on the d-line and the Abbe number (vb) of the lens (Gi), counting from the secondary image surface (I2) side.

In the orthogonal coordinate system (X, Y, Z), the center position of the eccentric standard surface (S1) is designated the origin point (0,0,0) of surface apex coordinate (XDE, YDE, ZDE)=(the horizontal eccentric position in the X-axis direction, the horizontal eccentric position in the Y-axis direction, the horizontal eccentric position in the Z-axis direction) and represents the position of the lead surface of horizontal eccentricity and rotational eccentricity (in the optical path diagrams, the counterclockwise direction toward the drawing surface is positive) at the rotational angle ADE (°) around the X-axis centered on the surface apex of this surface. Furthermore, the X-axis direction is a perpendicular direction relative to the drawing surface (in the optical path diagrams, the direction toward the rear surface of the drawing surface is positive), the Y-axis direction is a linear direction intersecting the drawing surface and the eccentric standard surface (S1) (in the optical path drawings, the upward direction is positive), and the Z-axis direction is the normal line direction of the eccentric standard surface (S1) (the primary image surface (I1) side is positive).

Surfaces S1 appended with an asterisk mark (*) represent aspherical surfaces, and in an orthogonal coordinate system (x, y, z) of standard surface apexes, the surface shape of the aspherical surface is defined by the equation (AS) below:

$$z = (c \cdot h^2)/[1+\sqrt{\{1-(1+K) \cdot c^2 \cdot h^2\}}] + (A \cdot h^4 + B \cdot h^6 + C \cdot h^8 + D \cdot h^{10+E \cdot h12} + F \cdot h^{14}) \quad (AS)$$

where, z represents a displacement from a standard surface in the optical axis direction, h represents a height in a direction perpendicular to the optical axis, and, for example, $h^2 = x^2 + y^2$, c represents a paraxial curvature, and K, A, B, C, D, E, F represent aspherical surface coefficients.

Aspherical surface data and other data are represented together, and numeric values corresponding to the conditional equations of each embodiment are shown in Table 1.

TABLE 1

| | Conditional Values | | | |
|---|---|---|---|---|
| Condition | | Embod. 1 | Embod. 2 | Embod. 3 |
| (1) | $\theta_{oi}$ (°) | 19.431 | 20.021 | 20.508 |
| (2) | $\theta_o$ (°) | 30.943 | 31.085 | 30.952 |
| (3) | $\theta_i$ (°) | 2.434 | 0.434 | 0.847 |

TABLE 1-continued

| | Conditional Values | | | |
|---|---|---|---|---|
| Condition | | Embod. 1 | Embod. 2 | Embod. 3 |
| (4) | Pf/Pn | 1.675 | 1.704 | 2.294 |
| (5) | Nf/Nn | 2.744 | 2.055 | 2.056 |
| | | (G2) | (G2) | (G2) |
| (6) | Nb | 1.827 | 1.847 | 1.847 |
| (7) | vb | 24.338 | 23.800 | 23.800 |
| (8) | −Rs/Ri | 4.212 | 0.574 | 0.929 |

Figure 7:
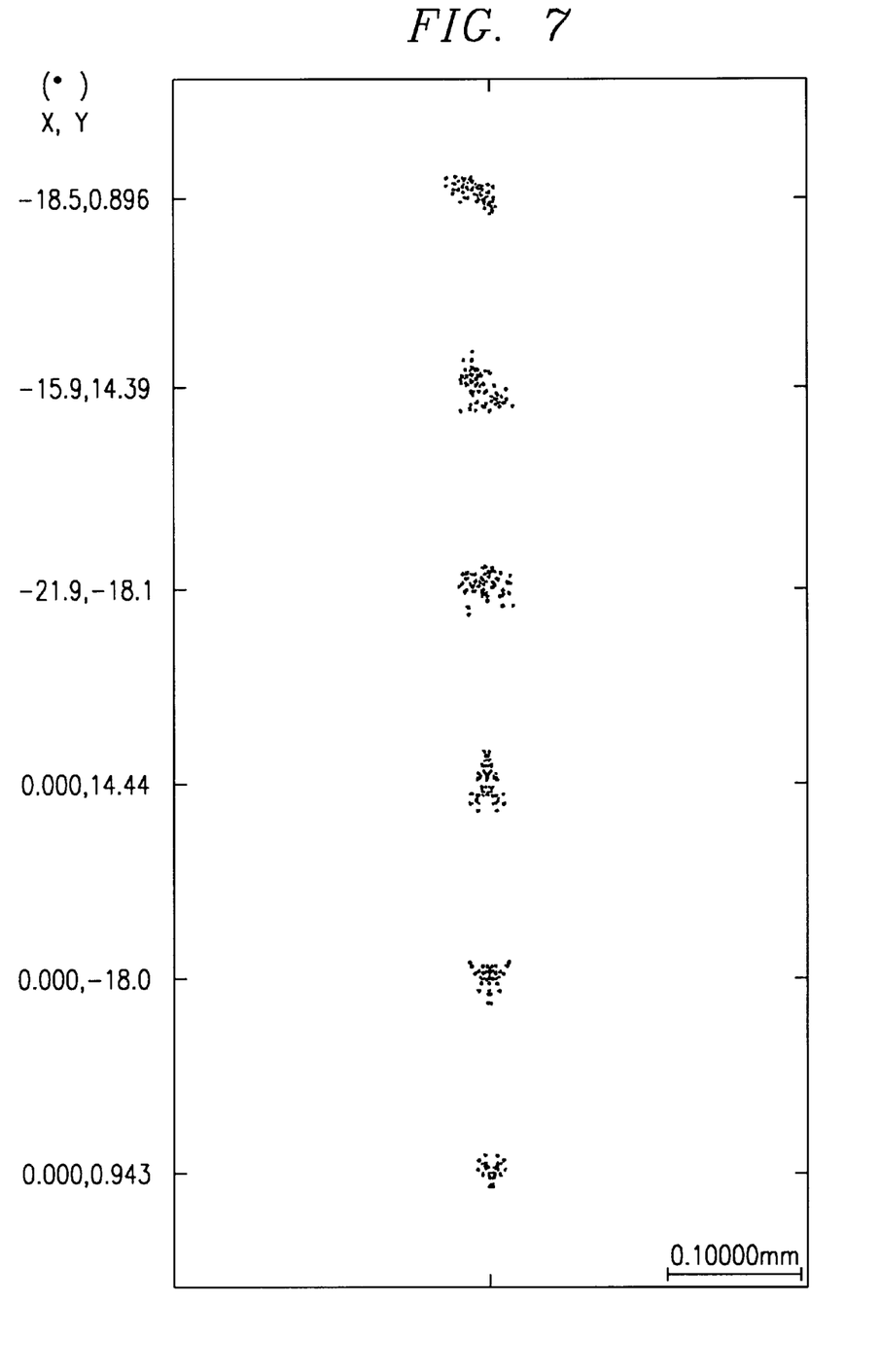
FIG. 7 is a spot diagram of the first embodiment.
Figure 8:
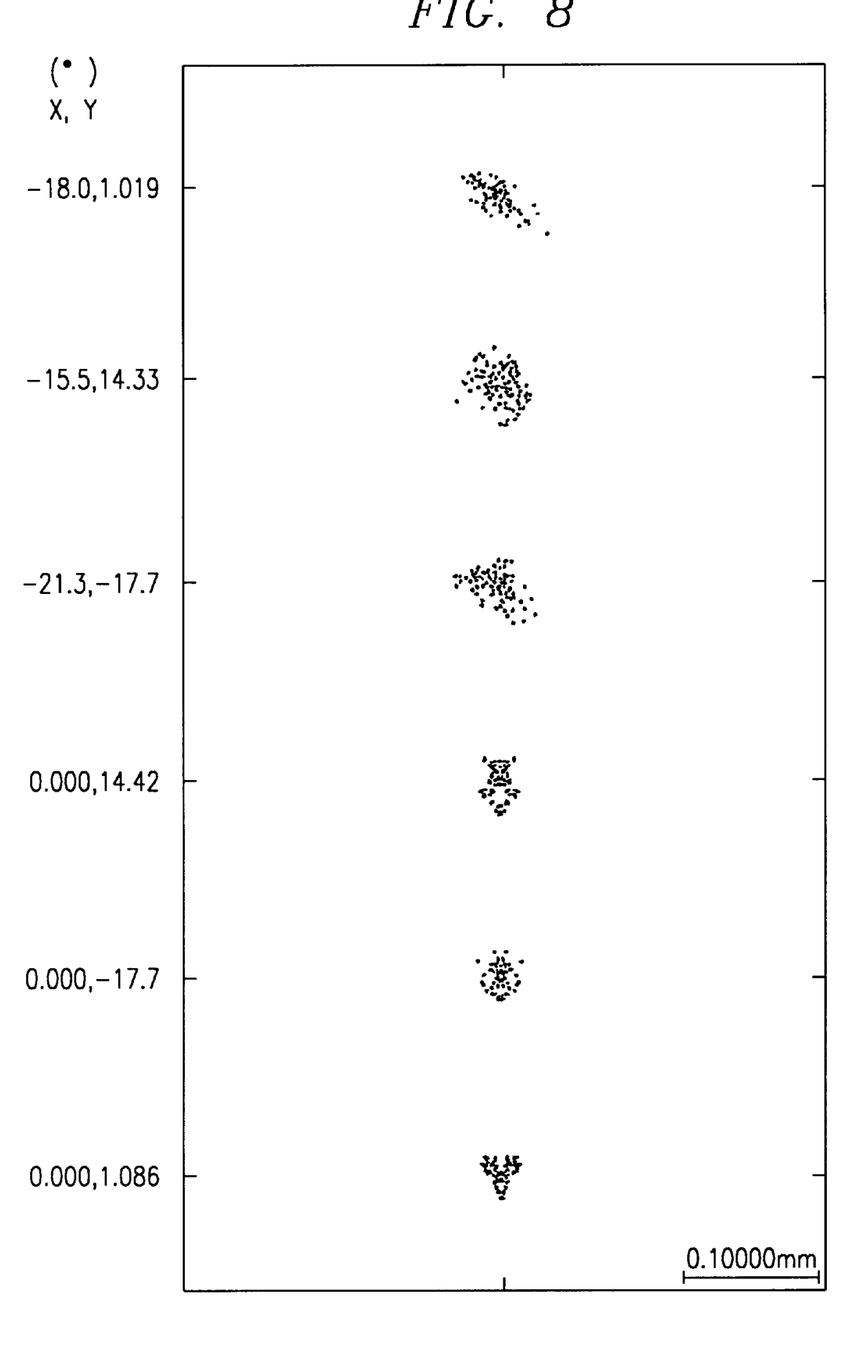
FIG. 8 is a spot diagram of the second embodiment.
Figure 9:
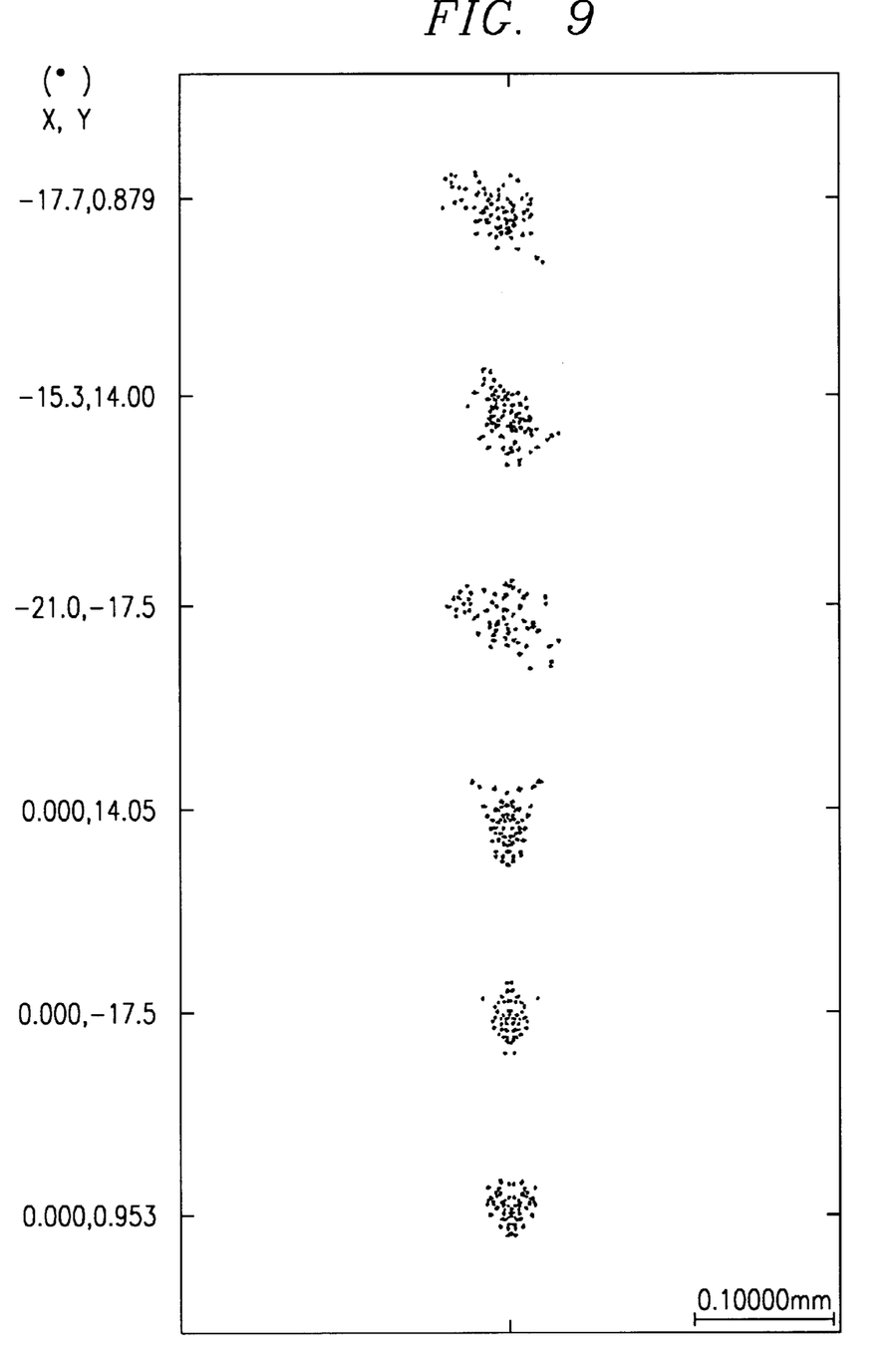
FIG. 9 is a spot diagram of the third embodiment.
Figure 10:
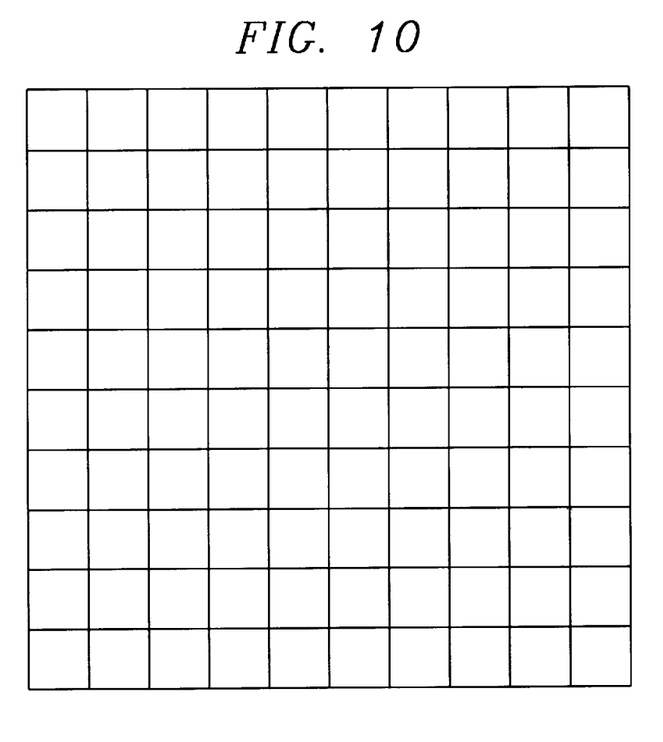
FIG. 10 is an aberration diagram of the first embodiment.
Figure 11:
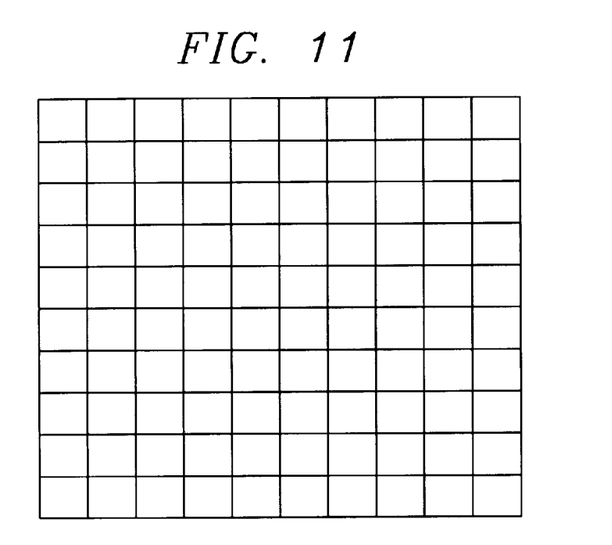
FIG. 11 is an aberration diagram of the second embodiment.
Figure 12:
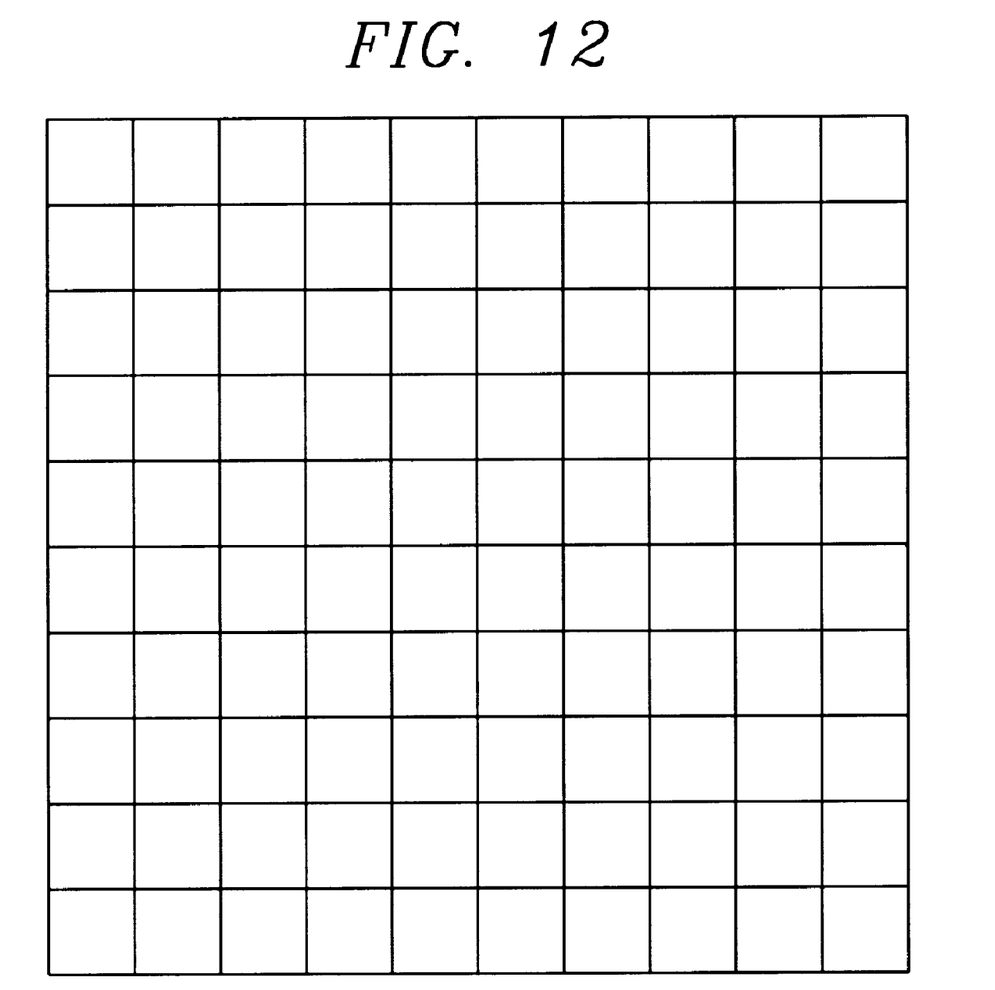
FIG. 12 is an aberration diagram of the third embodiment.

The optical performance of each embodiment is shown in the spot diagrams (FIGS. 7–9) and the aberration diagrams (FIGS. 10–12). The spot diagrams show image forming characteristics at the primary image surface (I1), and the aberration diagrams show the ray position at the primary image surface (I1) corresponding to the square mesh at the secondary image surface (I2). The evaluation area was ±400.0 mm in the X-axis direction and ±400.0 mm in the Y-axis direction on the secondary image surface (I2). The evaluation position on each primary image surface (I1) is represented by coordinates (X, Y) of the field angle. Although the secondary image surface (I2) functions as a screen and is the projection image surface, and the primary image surface (I1) functions as a display element surface and is the object surface in the above evaluation, the previously described embodiments may be regarded as reduction systems from an optical design perspective, in which case the optical properties are evaluated at the primary image surface (I1) and the secondary image surface (I2) is regarded as the object surface.

TABLE 2

| | Valued Position of Spot Diagram | | |
|---|---|---|---|
| Screen (mm) (x, y) | Embod. 1 (°) (x, y) | Embod. 2 (°) (x, y) | Embod. 3 (°) (x, y) |
| (400, 0) | (−18.5, 0.896) | (−18.0, 1.019) | (−17.7, 0.879) |
| (400, −400) | (−15.9, 14.39) | (−15.5, 14.33) | (−15.3, 14.00) |
| (400, 400) | (−21.9, −18.1) | (−21.3, −17.7) | (−21.0, −17.5) |
| (0, −400) | (0.000, 14.44) | (0.000, 14.42) | (0.000, 14.05) |
| (0, 400) | (0.000, −18.0) | (0.000, −17.7) | (0.000, −17.5) |
| (0, 0) | (0.000, 0.943) | (0.000, 1.086) | (0.000, 0.953) |

The embodiments having the constructions described above provide an oblique projection optical system having a wide angle of field and high magnification with a compact lens diameter and compact total length of the optical system while providing a sufficient oblique projection angle.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

| | Embodiment 1 | | | |
|---|---|---|---|---|
| Surface (Si) | Radius of Curvature (ri) | Axial Distance (di) | Refractive Index (N) | Abbe Number (v) |

-continued

Embodiment 1

| | | | | |
|---|---|---|---|---|
| S0 | ∞ | 1160.000 | | |
| S1 | ∞ | — | | |
| S2* | 69.134 | — | N1 = 1.610 | ν1 = 60.842 |
| S3* | 112.860 | — | | |
| S4* | −914.414 | 4.919 | N2 = 1.487 | ν2 = 70.400 |
| S5 | 44.553 | — | | |
| S6 | 77.058 | 2.400 | N3 = 1.666 | ν3 = 33.807 |
| S7* | 39.055 | — | | |
| S8 (SP) | ∞ | — | | |
| | (Eff. Dia. = 12.366) | | | |
| S9 | −566.242 | 2.400 | N4 = 1.789 | ν4 = 33.878 |
| S10 | 208.397 | — | | |
| S11 | 73.058 | 7.054 | N5 = 1.847 | ν5 = 23.800 |
| S12* | −127.255 | — | | |
| S13 | 123.395 | 10.000 | N6 = 1.527 | ν6 = 66.442 |
| S14 | −42.117 | — | | |
| S15 | −40.370 | 2.400 | N7 = 1.827 | ν7 = 24.338 |
| S16 | 61.122 | — | | |
| S17 | 90.480 | 6.867 | N8 = 1.620 | ν8 = 60.300 |
| S18 | −86.245 | — | | |
| S19 | 241.770 | 7.653 | N9 = 1.620 | ν9 = 60.300 |
| S20* | −57.394 | — | | |
| S21 | ∞ | | | |

| Aspherical Coefficient of 2d surface (S2) | Aspherical Coefficient of 3d surface (S3) |
|---|---|
| K = 0.000000 | K = 0.000000 |
| A = 0.255734 × 10E−6 | A = −0.171116 × 10E−7 |
| B = −0.527656 × 10E−9 | B = 0.239756 × 10E−10 |
| C = 0.374353 × 10E−12 | C = −0.598782 × 10E−14 |
| D = −0.149379 × 10E−15 | D = 0.387766 × 10E−18 |
| E = 0.289632 × 10E−19 | E = 0.202913 × 10E−23 |
| F = −0.236418 × 10E−23 | F = −0.103958 × 10E−26 |
| Decentering data of 2d surface (S2) | Decentering data of 3d surface (S3) |
| XDE = 0.000000 | XDE = 0.000000 |
| YDE = −16.006841 | YDE = −64.604686 |
| ZDE = −29.016665 | ZDE = 17.236888 |
| ADE = 23.592470 | ADE = 46.883230 |
| Aspherical Coefficient of 4th surface (S4) | Aspherical Coefficient of 7th surface (S7) |
| K = 0.000000 | K = 0.000000 |
| A = 0.318539 × 10E−5 | A = 0.526169 × 10E−5 |
| B = −0.900723 × 10E−9 | B = 0.133773 × 10E−7 |
| C = 0.207762 × 10E−12 | C = −0.296741 × 10E−10 |
| D = −0.438354 × 10E−17 | D = 0.539352 × 10E−13 |
| Decentering data of 4th surface (S4) | |
| XDE = 0.000000 | |
| YDE = 33.934229 | |
| ZDE = −13.368730 | |
| ADE = −10.384854 | |
| Aspherical Coefficient of 12th surface (S12) | Aspherical Coefficient of 20th surface (S20) |
| K = 0.000000 | K = 0.000000 |
| A = −0.572556 × 10E−7 | A = 0.170860 × 10E−5 |
| B = −0.115805 × 10E−9 | B = −0.203268 × 10E−9 |
| C = −0.111923 × 10E−12 | C = −0.242768 × 10E−12 |
| D = 0.114018 × 10E−14 | D = −0.408241 × 10E−16 |
| Decentering data of secondary image plane | Decentering data of 6th surface (S6) |
| ADE = −30.00000 | XDE = 0.000000 |
| | YDE = 18.596182 |
| | ZDE = 13.457002 |
| | ADE = −27.475566 |
| Decentering data of 8th surface (S8) | Decentering data of 9th surface (S9) |
| XDE = 0.000000 | XDE = 0.000000 |
| YDE = 0.000000 | YDE = −21.791470 |

-continued

Embodiment 1

| ZDE = 50.000000 | ZDE = 47.816265 |
|---|---|
| ADE = 0.000000 | ADE = −16.978165 |
| Decentering data of 11th surface (S11) | Decentering data of 13th surface (S13) |
| XDE = 0.000000 | XDE = 0.000000 |
| YDE = −7.724121 | YDE = −11.385599 |
| ZDE = 57.168388 | ZDE = 74.382088 |
| ADE = −12.274777 | ADE = −11.189631 |
| Decentering data of 15th surface (S15) | Decentering data of 17th surface (S17) |
| XDE = 0.000000 | XDE = 0.000000 |
| YDE = −14.283431 | YDE = −10.768851 |
| ZDE = 85.108727 | ZDE = 90.536112 |
| ADE = −12.374372 | ADE = −19.097371 |
| Decentering data of 19th surface (S19) | Decentering data of 21st surface (S21) |
| XDE = 0.000000 | XDE = 0.000000 |
| YDE = −14.539429 | YDE = 7.877106 |
| ZDE = 97.686059 | ZDE = 172.319703 |
| ADE = −14.739778 | ADE = −10.568690 |

Embodiment 2

| Surface (Si) | Radius of Curvature (ri) | Axial Distance (di) | Refractive Index (N) | Abbe Number (ν) |
|---|---|---|---|---|
| S0 | ∞ | 1160.000 | | |
| S1 | ∞ | — | | |
| S2* | 64.705 | — | N1 = 1.610 | ν1 = 60.835 |
| S3* | 178.564 | — | | |
| S4* | 355.434 | 1.400 | N2 = 1.488 | ν2 = 70.334 |
| S5 | 33.755 | — | | |
| S6 | 654.527 | 6.334 | N3 = 1.601 | ν3 = 37.631 |
| S7* | 49.247 | — | | |
| S8 (SP) | ∞ | — | | |
| | (Eff. Dia. = 10.668) | | | |
| S9 | −49.899 | 1.400 | N4 = 1.587 | ν4 = 48.492 |
| S10 | 133.654 | — | | |
| S11 | 87.253 | 10.378 | N5 = 1.721 | ν5 = 33.907 |
| S12* | −71.804 | — | | |
| S13 | 54.848 | 10.000 | N6 = 1.487 | ν6 = 70.400 |
| S14 | 1163.844 | — | | |
| S15 | −879.324 | 1.400 | N7 = 1.847 | ν7 = 23.800 |
| S16 | 51.448 | — | | |
| S17 | 57.315 | 8.259 | N8 = 1.487 | ν8 = 70.400 |
| S18 | −82.859 | — | | |
| S19 | 60.852 | 10.019 | N9 = 1.537 | ν9 = 65.627 |
| S20* | −105.997 | — | | |
| S21 | ∞ | | | |

| Aspherical Coefficient of 2d surface (S2) | Aspherical Coefficient of 3d surface (S3) |
|---|---|
| K = 0.000000 | K = 0.000000 |
| A = −0.811078 × 10E−7 | A = 0.222735 × 10E−6 |
| B = 0.156440 × 10E−9 | B = −0.351703 × 10E−10 |
| C = −0.662642 × 10E−13 | C = 0.445149 × 10E−14 |
| D = 0.134256 × 10E−16 | D = −0.181886 × 10E−18 |
| Decentering data of 2d surface (S2) | Decentering data of 3d surface (S3) |
| XDE = 0.000000 | XDE = 0.000000 |
| YDE = 7.235465 | YDE = −52.096347 |
| ZDE = −52.004098 | ZDE = 7.758144 |
| ADE = −10.878853 | ADE = 23.076001 |
| Aspherical Coefficient of 4th surface (S4) | Aspherical Coefficient of 7th surface (S7) |

-continued

Embodiment 2

K = 0.000000
A = 0.441671 × 10E−5
B = −0.166614 × 10E−8
C = 0.641959 × 10E−12
D = 0.981858 × 10E−16
Decentering data of 4th surface (S4)

XDE = 0.000000
YDE = 20.000000
ZDE = −2.308472
ADE = −9.165560
Aspherical Coefficient of 12th surface (S12)

K = 0.000000
A = 0.133038 × 10E−6
B = −0.283660 × 10E−10
C = 0.420448 × 10E−14
D = 0.378473 × 10E−16
Decentering data of secondary image plane

ADE = −30.00000

Decentering data of 8th surface (S8)

XDE = 0.000000
YDE = 0.000000
ZDE = 54.000000
ADE = 0.000000
Decentering data of 11th surface (S11)

XDE = 0.000000
YDE = −13.954383
ZDE = 57.541540
ADE = −2.413227
Decentering data of 15th surface (S15)

XDE = 0.000000
YDE = −20.000000
ZDE = 90.764919
ADE = 4.036767
Decentering data of 19th surface (S19)

XDE = 0.000000
YDE = −8.514606
ZDE = 102.776142
ADE = −4.329949

K = 0.000000
A = 0.953777 × 10E−5
B = 0.909686 × 10E−8
C = −0.316742 × 10E−12
D = 0.450759 × 10E−13

Aspherical Coefficient of 20th surface (S20)

K = 0.000000
A = 0.259950 × 10E−5
B = −0.149358 × 10E−9
C = 0.417800 × 10E−12
D = −0.198571 × 10E−15
Decentering data of 6th surface (S6)

XDE = 0.000000
YDE = 8.211415
ZDE = 8.865275
ADE = −11.151450

Decentering data of 9th surface (S9)

XDE = 0.000000
YDE = −8.582231
ZDE = 54.993967
ADE = −10.212655
Decentering data of 13th surface (S13)

XDE = 0.000000
YDE = −9.229185
ZDE = 72.410138
ADE = 0.461869
Decentering data of 17th surface (S17)

XDE = 0.000000
YDE = −12.527083
ZDE = 93.287290
ADE = −5.200504
Decentering data of 21st surface (S21)

XDE = 0.000000
YDE = 23.094709
ZDE = 180.767199
ADE = −9.978634

Embodiment 3

| Surface (Si) | Radius of Curvature (ri) | Axial Distance (di) | Refractive Index (N) | Abbe Number (ν) |
|---|---|---|---|---|
| S0 | ∞ | 1160.000 | | |
| S1 | ∞ | — | | |
| S2 | 59.725 | 31.796 | N1 = 1.738 | ν1 = 50.656 |
| S3 | 62.738 | — | | |
| S4* | 167.959 | 2.500 | N2 = 1.487 | ν2 = 70.400 |
| S5 | 41.689 | — | | |
| S6 | 89.416 | 2.500 | N3 = 1.614 | ν3 = 36.037 |
| S7* | 49.188 | — | | |
| S8 (SP) | ∞ | — | | |

-continued

Embodiment 3

(Eff. Dia. = 8.765)

| | | | | |
|---|---|---|---|---|
| S9 | −26.002 | 3.758 | N4 = 1.620 | ν4 = 60.300 |
| S10 | −355.801 | — | | |
| S11 | 155.400 | 15.452 | N5 = 1.612 | ν5 = 60.711 |
| S12* | −47.997 | — | | |
| S13 | 69.490 | 10.000 | N6 = 1.487 | ν6 = 70.400 |
| S14 | 897.565 | — | | |
| S15 | −161.271 | 2.500 | N7 = 1.847 | ν7 = 23.800 |
| S16 | 97.141 | — | | |
| S17 | 85.520 | 12.999 | N8 = 1.654 | ν8 = 56.777 |
| S18 | −80.068 | — | | |
| S19 | 96.557 | 9.538 | N9 = 1.620 | ν9 = 60.300 |
| S20* | −103.948 | — | | |
| S21 | ∞ | | | |

Aspherical Coefficient of 4th surface (S4)

K = 0.000000
A = 0.327861 × 10E−5
B = 0.586672 × 10E−9
C = −0.104273 × 10E−11
D = 0.643637 × 10E−15
Decentering data of 4th surface (S4)

XDE = 0.000000
YDE = 20.000000
ZDE = −2.308472
ADE = −9.165560
Aspherical Coefficient of 12th surface (S12)

K = 0.000000
A = 0.550585 × 10E−6
B = −0.370362 × 10E−9
C = 0.455352 × 10E−12
D = −0.175467 × 10E−15
Decentering data of secondary image plane

ADE = −30.00000

Decentering data of 4th surface (S4)

XDE = 0.000000
YDE = 20.000000
ZDE = 13.622629
ADE = −9.873794
Decentering data of 8th surface (S8)

XDE = 0.000000
YDE = 0.000000
ZDE = 54.000000
ADE = 0.000000
Decentering data of 11th surface (S11)

XDE = 0.000000
YDE = −17.119688
ZDE = 61.057269
ADE = −4.395377
Decentering data of 15th surface (S15)

XDE = 0.000000
YDE = −20.000000
ZDE = 97.656431
ADE = 1.996363
Decentering data of 19th surface (S19)

Aspherical Coefficient of 7th surface (S7)

K = 0.000000
A = 0.902997 × 10E−5
B = −0.878277 × 10E−8
C = 0.717799 × 10E−10
D = −0.833737 × 10E−13

Aspherical Coefficient of 20th surface (S20)

K = 0.000000
A = 0.236800 × 10E−5
B = −0.251690 × 10E−9
C = 0.341436 × 10E−12
D = 0.446726 × 10E−16
Decentering data of 2d surface (S2)

XDE = 0.000000
YDE = −20.00000
ZDE = −37.362760
ADE = 14.945406
Decentering data of 6th surface (S6)

XDE = 0.000000
YDE = 6.411200
ZDE = 31.201507
ADE = −8.474310
Decentering data of 9th surface (S9)

XDE = 0.000000
YDE = −8.514930
ZDE = 55.046071
ADE = −20.000000
Decentering data of 13th surface (S13)

XDE = 0.000000
YDE= 4.599417
ZDE = 80.809865
ADE = −20.000000
Decentering data of 17th surface (S17)

XDE = 0.000000
YDE = −12.332506
ZDE = 101.901268
ADE = −6.894365
Decentering data of 21st surface (S21Y -continued Embodiment 3

| | |
|---|---|
| XDE = 0.000000 | XDE = 0.000000 |
| YDE = −13.520380 | YDE = −3.835328 |
| ZDE = 115.854404 | ZDE = 188.957037 |
| ADE = −7.619947 | ADE = −9.492371 |

What is claimed is:

1. An oblique projection optical system for projecting a primary image on a primary image surface as a secondary image onto a secondary image surface in an oblique direction, the oblique projection optical system comprising a plurality of lens elements to effect an enlargement of the primary image, the oblique projection optical system including at least two eccentric lens elements, wherein an intermediate real image is not formed between the primary image and the secondary image, wherein the following conditions are satisfied, whereas image center rays are defined by light rays that operatively extend between a center of the primary image surface and a center of the secondary image surface:

$$15° < \theta_{oi} < 40°$$

$$20° < \theta_o < 50°$$

$$0° \leq \theta_i < 5°$$

where, $\theta_{oi}$ represents an angle formed between the primary image surface and the secondary image surface, $\theta_o$ represents an angle formed between a line normal to the secondary image surface and the image center rays, and $\theta_i$ represents an angle formed between a line normal to the primary image surface and the image center rays.

2. An oblique projection optical system in accordance with claim 1, wherein the following condition is further satisfied:

$$1.2 < Pf/Pn < 2.7$$

where,

Pn represents a distance between an incident point on a primary image-side surface of an outer-most, secondary image side lens element and an exit point on a secondary image side surface of the outer-most lens element for a principal ray, transmitted by the outer-most lens element, that forms a smallest angle with a line normal to the secondary image surface, and Pf represents a distance between an incident point on the primary image-side surface of the outer-most, secondary image side lens element and an exit point on the object-side surface of the outer-most lens element for a principal ray, transmitted by the outer-most lens element, that forms a largest angle with a line normal to the secondary image surface.

3. An oblique projection optical system in accordance with claim 1, wherein an outer-most, secondary image side lens element of the plurality of lens elements is a biconvex positive lens, and the outer-most lens element satisfies the following condition:

$$0.1 < -Rs/Ri < 10$$

where,

Rs represents a radius of curvature of a secondary image side of the outer-most lens element, and Ri represents a radius of curvature of a primary image-side of the outer-most lens element.

4. An oblique projection optical system in accordance with claim 1, wherein the plurality of lens elements includes a positive-negative-positive lens array.

5. An oblique projection optical system in accordance with claim 4, wherein the negative lens element of the positive-negative-positive lens array satisfies the following conditions:

$$Nb > 1.7$$

$$vb < 40$$

where,

Nb represents a refractive index relative to a d-line of a medium of the negative lens element of the positive-negative-positive lens array, and vb represents an Abbe number of the medium of the negative lens element.

6. An oblique projection optical system in accordance with claim 1, wherein the primary image surface is a display element surface.

7. An oblique projection optical system in accordance with claim 1, wherein the secondary image surface is a projection image surface.

8. An oblique projection optical system for projecting a primary image on a primary image surface as a secondary image onto a secondary image surface in an oblique direction, the oblique projection optical system comprising a plurality of lens elements to effect a reduction of the primary image, the oblique projection optical system including at least two eccentric lens elements, wherein an intermediate real image is not formed between the primary image and the secondary image, wherein the following conditions are satisfied, whereas image center rays are defined by light rays that operatively extend between a center of the primary image surface and a center of the secondary image surface:

$$15° < \theta_{oi} < 40°$$

$$20° < \theta_o < 50°$$

$$0° \leq \theta_i < 5°$$

where, $\theta_{oi}$ represents an angle formed between the primary image surface and the secondary image surface, $\theta_o$ represents an angle formed between a line normal to the secondary image surface and the image center rays, and $\theta_i$ represents an angle formed between a line normal to the primary image surface and the image center rays.

9. An oblique projection optical system in accordance with claim 8, wherein the following condition is further satisfied:

$$1.2 < Pf/Pn < 2.7$$

where,

Pn represents a distance between an incident point on an inner-most, primary image-side lens element and an exit point on a secondary image-side surface of the inner-most lens element for a principal ray, transmitted by the inner-most lens element, that forms a smallest angle with a line normal to the secondary image surface, and Pf represents a distance between an incident point on the inner-most, primary image-side lens element and an exit point on the secondary image-side surface of the inner-most lens element for a principal ray, transmitted by the inner-most lens element, that forms a largest angle with a line normal to the secondary image surface.

10. An oblique projection optical system in accordance with claim 8, wherein an inner-most primary image-side lens element of the plurality of lens elements is a biconvex positive lens, and the inner-most lens element satisfies the following condition:

$$0.1 < -Rs/Ri < 10$$

where,

Rs represents a radius of curvature of a primary image side of the inner-most lens element, and Ri represents a radius of curvature of a secondary image side of the inner-most lens element.

11. An oblique projection optical system in accordance with claim 8, wherein the plurality of lens elements includes a positive-negative-positive lens array.

12. An oblique projection optical system in accordance with claim 11, wherein the negative lens element of the positive-negative-positive lens array satisfies the following conditions:

$$Nb > 1.7$$

$$\nu b < 40$$

where,

Nb represents a refractive index relative to a d-line of a medium of the negative lens element of the positive-negative-positive lens array, and $\nu b$ represents an Abbe number of the medium of the negative lens element.

13. An oblique projection optical system in accordance with claim 8, wherein the primary image surface includes an original object.

14. An oblique projection optical system in accordance with claim 8, wherein the secondary image surface is a photoreceptor.

* * * * *